US010325244B2

(12) United States Patent
Zhang et al.

(10) Patent No.: US 10,325,244 B2
(45) Date of Patent: Jun. 18, 2019

(54) METHOD AND DEVICE FOR PROCESSING A COMMUNICATION MESSAGE

(71) Applicant: Xiaomi Inc., Beijing (CN)

(72) Inventors: Liang Zhang, Beijing (CN); Liangxiong Wu, Beijing (CN); Ke Wang, Beijing (CN)

(73) Assignee: Xiaomi Inc., Beijing (CN)

(*) Notice: Subject to any disclaimer, the term of this patent is extended or adjusted under 35 U.S.C. 154(b) by 365 days.

(21) Appl. No.: 15/241,845

(22) Filed: Aug. 19, 2016

(65) Prior Publication Data

US 2017/0061391 A1 Mar. 2, 2017

(30) Foreign Application Priority Data

Aug. 26, 2015 (CN) .......................... 2015 1 0532207

(51) Int. Cl.
*G06Q 10/10* (2012.01)
*H04L 12/58* (2006.01)
*H04L 29/12* (2006.01)

(52) U.S. Cl.
CPC ....... *G06Q 10/1095* (2013.01); *H04L 51/046* (2013.01); *H04L 51/24* (2013.01); *H04L 61/1594* (2013.01)

(58) Field of Classification Search
CPC ... B06Q 10/1095; H04L 51/046; H04L 51/24; H04L 61/1594
USPC ........................................................ 705/7.19
See application file for complete search history.

(56) References Cited

U.S. PATENT DOCUMENTS

| 9,131,051 | B2 | 9/2015 | Lederer | |
|---|---|---|---|---|
| 2002/0165919 | A1 | 11/2002 | Pietila | |
| 2003/0087668 | A1* | 5/2003 | Lee ................. | H04M 1/274575 455/556.1 |
| 2004/0249890 | A1* | 12/2004 | Fellenstein ............ | H04L 51/24 709/206 |

(Continued)

FOREIGN PATENT DOCUMENTS

| CN | 1418037 A | 5/2003 |
|---|---|---|
| CN | 101658022 A | 2/2010 |

(Continued)

OTHER PUBLICATIONS

International Search Report of PCT/CN2015/097650, mailed from the State Intellectual Property Office of China dated May 19, 2016.

(Continued)

*Primary Examiner* — Dylan C White
(74) *Attorney, Agent, or Firm* — Finnegan, Henderson, Farabow, Garrett & Dunner LLP

(57) ABSTRACT

According to a first aspect of the present disclosure, there is provided a method for processing a communication message. The method includes: acquiring a communication message transmitted between a first terminal and a second terminal; and sending prompt information to at least one of the first terminal and the second terminal when the communication message includes a predetermined schedule word, the predetermined schedule word being relevant to scheduling an appointment, the prompt information including information for reminding a user of the at least one of the first terminal and the second terminal to acquire contact information of a user of the other terminal.

15 Claims, 8 Drawing Sheets

(56) References Cited

U.S. PATENT DOCUMENTS

| | | | |
|---|---|---|---|
| 2010/0011317 A1* | 1/2010 | Lee | H04L 12/189 |
| | | | 715/784 |
| 2010/0034369 A1 | 2/2010 | Lederer | |
| 2013/0035054 A1* | 2/2013 | Ashton | H04M 1/576 |
| | | | 455/404.1 |
| 2013/0163742 A1* | 6/2013 | Lim | H04M 3/44 |
| | | | 379/216.01 |
| 2014/0006970 A1* | 1/2014 | Casey | G06Q 50/01 |
| | | | 715/753 |
| 2014/0089436 A1* | 3/2014 | Zhang | H04L 51/30 |
| | | | 709/206 |
| 2014/0155111 A1* | 6/2014 | Yang | G06F 3/0486 |
| | | | 455/466 |
| 2015/0081371 A1* | 3/2015 | Tang | G06Q 10/1095 |
| | | | 705/7.19 |
| 2015/0160799 A1* | 6/2015 | Won | G06F 3/0482 |
| | | | 715/739 |
| 2015/0186012 A1* | 7/2015 | Coleman | G06F 3/04842 |
| | | | 715/752 |
| 2015/0220888 A1* | 8/2015 | Iyer | G06Q 10/1095 |
| | | | 705/7.19 |
| 2016/0182661 A1* | 6/2016 | Brezina | H04M 15/00 |
| | | | 709/206 |

FOREIGN PATENT DOCUMENTS

| | | | | | |
|---|---|---|---|---|---|
| CN | 102497391 A | 6/2012 | | | |
| CN | 103546644 A | 1/2014 | | | |
| CN | 104254050 A | 12/2014 | | | |
| CN | 104284020 A | 1/2015 | | | |
| CN | 104700257 A | 6/2015 | | | |
| CN | 105141506 A | 12/2015 | | | |
| EP | 2144192 A1 | 1/2010 | | | |
| EP | 2144192 A1 * | 1/2010 | | | G06Q 10/107 |
| EP | 3136657 A1 * | 3/2017 | | | H04L 51/24 |
| JP | 2003-115951 A | 4/2003 | | | |
| JP | 2004-96171 A | 3/2004 | | | |
| JP | 2014-106592 A | 6/2014 | | | |
| KR | 10-2004-0024840 A | 3/2004 | | | |
| KR | 10-2007-0096198 A | 10/2007 | | | |
| KR | 10-2008-0001729 A | 1/2008 | | | |
| KR | 10-0893689 B1 | 4/2009 | | | |
| KR | 10-2010-0003870 A | 1/2010 | | | |
| KR | 10-2015-0095261 A | 8/2015 | | | |
| RU | 2395114 C2 | 7/2010 | | | |
| WO | WO 2014/008782 A1 | 1/2014 | | | |

OTHER PUBLICATIONS

Extended European Search Report of European Patent Application No. 16161265.0, from the European Patent Office, dated Jan. 26, 2017.

Office Action for Korean Application No. 10-2016-7004065, mailed from the Korean Intellectual Office dated Oct. 14, 2016.

Office Action for Korean Application No. 10-2016-7004065, mailed from the Korean Intellectual Office dated Feb. 27, 2017.

Notification on the Results of Patentability Check for Russian Application No. 2016110899/08(017224), mailed from the Russian Federal Service for Intellectual Property dated Mar. 24, 2017.

Office Action for Chinese Application No. 201510532207.8, mailed from the State Intellectual Property Office of China dated Sep. 21, 2017.

* cited by examiner

METHOD AND DEVICE FOR PROCESSING A COMMUNICATION MESSAGE

CROSS-REFERENCE TO RELATED APPLICATIONS

This application is based upon and claims priority to Chinese Patent Application 201510532207.8, filed Aug. 26, 2015, the entire contents of which are incorporated herein by reference.

FIELD

The present disclosure generally relates to the field of communication, and more particularly, to a method and device for processing a communication message and computer-readable medium.

BACKGROUND

With fast development of network technology, a social application has been a most popular means for communicating among users. Two users may negotiate a certain schedule by using a social application.

For example, a first user may send a communication message to a second user based on an account number of the second user, and the second user may also send a communication message to the first user based on an account number of the first user. When the two users try to make an appointment with each other, the first user may send meeting information, e.g., a time and a place for the appointment, to the second user through a social application. The second user may acknowledge the meeting information, or changes the meeting information after viewing it and then sends the changed information back to the first user. On the meeting day, the first user may call the second user to confirm current location of the second user when the first user arrives at the meeting place at the meeting time.

SUMMARY

According to a first aspect of the present disclosure, there is provided a method for processing a communication message. The method includes: acquiring a communication message transmitted between a first terminal and a second terminal; and sending prompt information to at least one of the first terminal and the second terminal when the communication message includes a predetermined schedule word, the predetermined schedule word being relevant to scheduling an appointment, the prompt information including information for reminding a user of the at least one of the first terminal and the second terminal to acquire contact information of a user of the other terminal.

According to another aspect of the present disclosure, there is provided a method for processing a communication message performed at a first terminal. The method includes: acquiring a communication message transmitted with a second terminal; and outputting prompt information when the communication message includes a predetermined schedule word, the predetermined schedule word being relevant to scheduling an appointment, the prompt information including information for reminding a user of the first terminal to acquire contact information of a user of the second terminal.

According to another aspect of the present disclosure, there is provided a device for processing a communication message. The device includes a processor and a memory for storing instructions executable by the processor. The processor is configured to: acquire a communication message transmitted between a first terminal and a second terminal; determine whether the communication message includes a predetermined schedule word; and send prompt information to at least one of the first terminal and the second terminal when the communication message includes the predetermined schedule word, the predetermined schedule word being relevant to scheduling an appointment, the prompt information including information for reminding a user of the at least one of the first terminal and the second terminal to acquire contact information of a user of the other terminal.

According to another aspect of the present disclosure, there is provided a device for processing a communication message. The device includes a processor, and a memory for storing instructions executable by the processor. The processor is configured to: acquire a communication message transmitted with a second terminal; determine whether the communication message includes a predetermined schedule word; and output prompt information when the communication message includes the predetermined schedule word, the predetermined schedule word being relevant to scheduling an appointment, the prompt information including information for reminding a user of the first terminal to acquire contact information of a user of the second terminal.

It is to be understood that both the forgoing general descriptions and the following detailed descriptions are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the invention and, to together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The present disclosure provides methods, systems, and devices for processing a communication message, which will be described in details with reference to the appended drawings.

Figure 1:
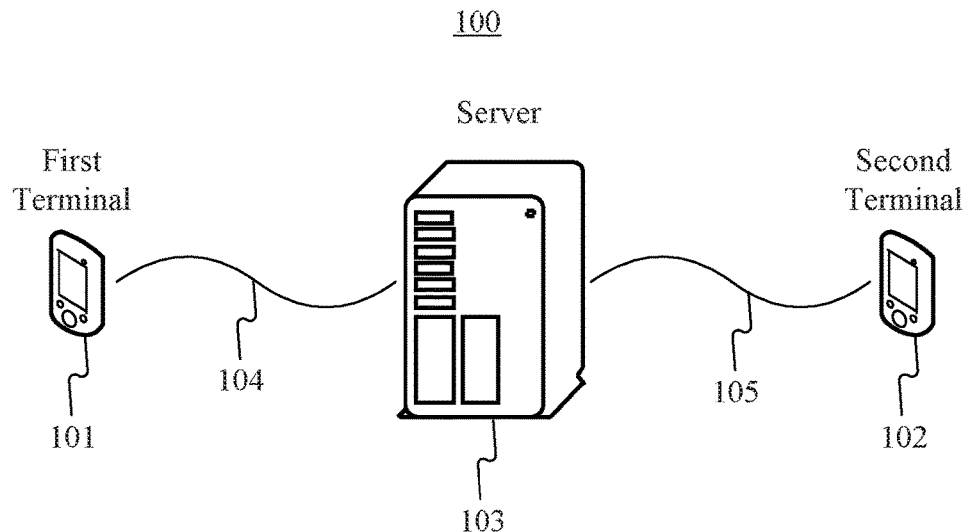
FIG. 1 is a block diagram showing an interactive system according to an exemplary embodiment of the present disclosure.

FIG. 1 is a block diagram showing an interactive system 100 according to an exemplary embodiment. As shown in FIG. 1, the interactive system 100 includes: a first terminal 101, a second terminal 102, and a server 103. The first terminal 101 may be connected with the server 103 via a network 104, and the second terminal 102 may be connected with the server 103 via a network 105.

The first terminal 101 and the second terminal 102 may transmit a communication message through the server 103. The communication message may be sent by the first terminal 101 to the second terminal 102 or sent by the second terminal 102 to the first terminal 101.

For example, the first terminal 101 sends a communication message to the server 103. The server 103 forwards the communication message to the second terminal 102. The second terminal 102 displays the communication message after receiving it. In some embodiments, the second terminal 102 sends a communication message to the server 103. The server 103 forwards the communication message to the first terminal 101. The first terminal then displays the communication message when receiving it.

The server 103 may acquire the communication messages transmitted between the first terminal 101 and the second terminal 102, determine whether the communication messages include a predetermined word relevant to scheduling an appointment ("schedule word"), and send prompt information to at least one of the first terminal 101 or the second terminal 102 when the communication messages are determined to include a predetermined schedule word. The prompt information can remind a user of the at least one of the first terminal 101 or the second terminal 102 to acquire contact information of a user of the other terminal.

The first terminal 101 is configured to display the prompt information sent by the server 103 when receiving the prompt information. The second terminal 102 is configured to display the prompt information sent by the server 103 when receiving the prompt information.

According to the system 100 provided by the present disclosure, the server 103 acquires a communication message transmitted between terminals, determines whether the communication message includes a predetermined schedule word, and sends prompt information to at least one of the terminals when the communication message is determined to include a predetermined schedule word. At least one of the terminals that receives the prompt information is configured to display the prompt information to remind its user to acquire the contact information of the other user when the two users are negotiating a schedule. The user who acquires the other user's contact information may communicate with the other user based on the acquired contact information, to avoid inconvenience on the schedule date for lack of the opponent's contact information.

Figure 2:
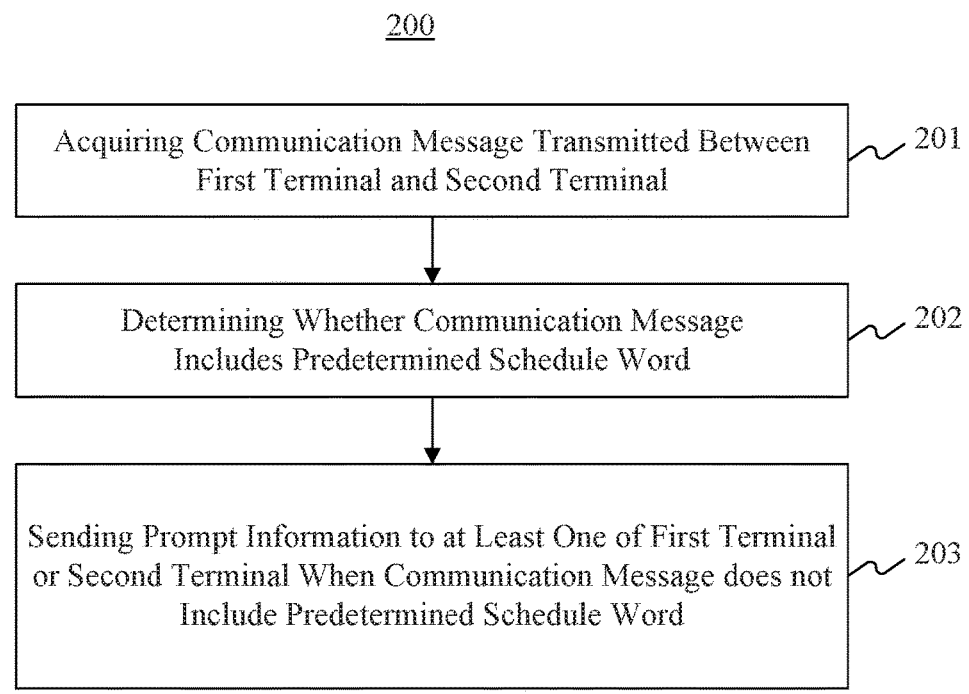
FIG. 2 is a flow chart showing a method for processing a communicating message according to an exemplary embodiment of the present disclosure.

FIG. 2 is a flow chart showing a method 200 for processing a communicating message according to an exemplary embodiment. As shown in FIG. 2, the method 200 for processing a communication message may be performed by a server, such as the server 103 in FIG. 1. The method 200 includes the following steps.

In step 201, the server acquires a communication message transmitted between a first terminal and a second terminal.

In step 202, the server determines whether the communication message includes a predetermined schedule word.

In step 203, the server sends prompt information to at least one of the first terminal and the second terminal when the communication message is determined to include a predetermined schedule word. The prompt information is to remind a user of the at least one of the first terminal and the second terminal to acquire contact information of a user of the other terminal.

According to the method 200 provided by the present disclosure, a server acquires a communication message transmitted between terminals, determines whether the communication message includes a predetermined schedule word, and sends prompt information to at least one of the terminals when the communication message is determined to include a predetermined schedule word. At least one of the terminals that receives the prompt information is configured to display the prompt information to remind its user to acquire the contact information of the other user when the two users are negotiating a schedule. The user who acquires the other user's contact information may communicate with the other user based on the acquired contact information, to avoid inconvenience on the schedule date for lack of the opponent's contact information.

In some embodiments, the step 201 of acquiring a communication message transmitted between the first terminal and the second terminal includes: receiving a communication message sent by the first terminal to the second terminal; or receiving a communication message sent by the second terminal to the first terminal.

In some embodiments, before determining whether the communication message includes a predetermined schedule word, the method 200 may include: determining whether the communication message is a text message; and converting the communication message to a text message when the communication message is not a text message.

In some embodiments, the step 202 of determining whether the communication message includes a predetermined schedule word may include: acquiring at least one word from the communication message using a word segmentation algorithm; determining whether the at least one word is included in a pre-stored set of predetermined schedule words; and determining that the communication message includes a predetermined schedule word when the at least one word is included in the set of predetermined schedule words.

In some embodiments, the step 203 of sending prompt information to at least one of the first terminal and the second terminal when the communication message is determined to include a predetermined schedule word may include: sending a query request to the first terminal, the query request including at least an identification of a second user associated with the second terminal when the communication message is determined to include a predetermined schedule word, such that the first terminal searches for contact information corresponding to the second user's identification upon reception of the query request; and when query failure information from the first terminal is received, sending the prompt information to the first terminal.

In some embodiments, the step 203 of sending prompt information to at least one of the first terminal and the second terminal when the communication message is determined to include a predetermined schedule word may include: sending a query request to the second terminal, the query request including at least an identification of a first user associated with the first terminal, when the communication message is determined to include a predetermined schedule word, such that the second terminal searches for contact information corresponding to the first user's identification upon reception of the query request; and when query failure information from the second terminal is received, sending the prompt information to the second terminal.

In some embodiments, the step 203 of sending prompt information to at least one of the first terminal and the second terminal when the communication message is determined to include a predetermined schedule word may include: acquiring second data information corresponding to the second terminal when the communication message is determined to include a predetermined schedule word; determining whether the second data information includes contact information; and when the second data information does not include the contact information, sending the prompt information to the first terminal.

In some embodiments, the step 203 of sending prompt information to at least one of the first terminal and the second terminal when the communication message is determined to include a predetermined schedule word may include: acquiring first data information corresponding to the first terminal when the communication message is determined to include a predetermined schedule word; determining whether the first data information includes contact information; and when the first data information does not include the contact information, sending the prompt information to the second terminal.

All or a portion of the technical solutions described above may be combined with each other, and the implementation of which will not be elaborated herein.

Figure 3:
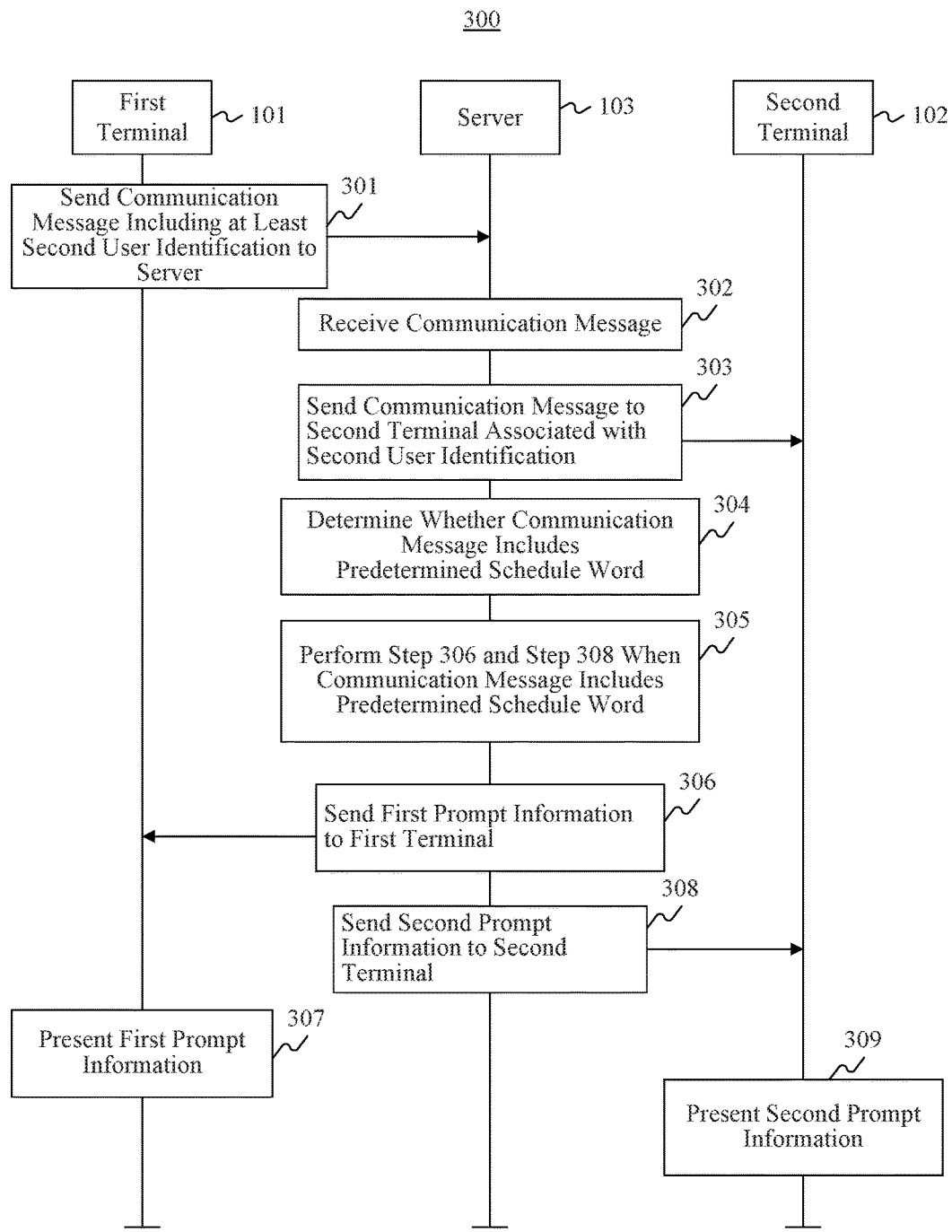
FIG. 3 is a flow chart showing another method for processing a communicating message according to an exemplary embodiment of the present disclosure.

FIG. 3 is a flow chart showing a method 300 for processing communicating message according to an exemplary embodiment. As shown in FIG. 3, the method 300 for processing a communication message may be implemented by a first terminal, such as the first terminal 101, a second terminal, such as the second terminal 102, and a server, such as the server 103. The method 300 includes the following steps.

In step 301, the first terminal 101 sends a communication message including at least a second user identification to the server 103.

In step 302, the server 103 receives the communication message.

The first terminal 101 and the second terminal 102 may be a computer, a handset, and the like, that is capable of sending and receiving communication messages and not limited to these examples. The first terminal 101 and the second terminal 102 may both be installed with a social application, e.g., an instant messaging application, an information presenting application, and the like, and be coupled to the server 103 by the social application. In some embodiments, the server 103 may be an instant messaging server, an information presenting server, and the like, which is capable of supporting the application program and not limited to these examples.

The first terminal 101 and the second terminal 102 may transmit a communication message through a social application. In one example, the first terminal 101 sends a communication message to the second terminal 102 through the social application. Based on a first user identification, the first terminal 101 logins the server 103, which maintains a user relationship chain for the first user identification. The user relationship chain indicates a relationship between the first user identification and one or more other user identifications. The first terminal 101 may acquire the user relationship chain of the first user identification through the social application and present/display the user relationship chain. When the first terminal 101 detects a selection of a second user identification of the user relationship chain, the first terminal 101 may display the interactive interface with the second user identification, acquire a communication message inputted by the first user in the interactive interface, and send the communication message to the server 103. The server 103 may send the communication message including the second user identification to the second terminal 102. The communication message indicates that the communication message is sent by the first terminal 101 to the second terminal 102.

In some embodiments, the first user identification may be a nickname or an account number of the first user, and the like, to uniquely identify the first user associated with the first terminal 101. The second user identification may be a nickname or an account number of the second user, and the like to uniquely identify the second user associated with the second terminal 102. The interactive interface between the first user and the second user may be an instant messaging window, an email editing interface, and the like, which is not limited by these examples.

In some embodiments, format of the communication message may be, for example, a text message, a voice message, a video message, and the like. Content of the communication message may include, for example, words for showing schedule, hot news, traffic information, and the like, which is not limited by these examples.

In step 303, the server 103 sends the communication message to the second terminal 102 associated with the second user identification.

According to the second user identification, the server 103 may determine the second terminal 102 associated with the second user identification, and send the communication message to the second terminal 102. In one embodiment, the communication message includes the first user identification. The second terminal 102 may present the communication message when receiving it. The second user may view the first user identification to learn that the communication message is sent by the first user.

In step 304, the server 103 determines whether the communication message includes a predetermined schedule word.

In one embodiment, the first user and the second user may negotiate a schedule by exchanging communication messages through the social application. In the negotiation process, the two users interact with each other based on their corresponding user identifications.

After completing the schedule negotiation, one of the users may need contact information of the other user for contacting the other user. However, the users may acquire only the user identification of the other user during the negotiation. Thus, if one of the users does not acquire the contact information of the other user, he or she cannot contact with the other user following the negotiation, which causes inconvenience. Therefore, the server 103 may remind a user to acquire the contact information of the other user while the first user and the second user are negotiating the schedule.

In order to determine whether the first user and the second user are negotiating a schedule, the server 103 may determine whether the communication messages include a predetermined schedule word when receiving the communication message. According to one embodiment of the present disclosure, the server 103 may determine that the first user and the second user are negotiating schedule when the communication includes a predetermined schedule word. One or both of the first user and the second user may be reminded to acquire contact information of the other user. According to another embodiment of the disclosure, the server 103 may determine the first user and the second user are not negotiating a schedule when the communication does not include a predetermined schedule word. Therefore, there is no need to remind the first user or the second user to acquire the contact information of the other user.

In some embodiments, the predetermined schedule words may be words indicating a schedule which may be a activity time, an activity place, an activity sponsors, an activity participants of a schedule, and the like. And the predetermined schedule words may be acquired in advance by sampling words for general users negotiating a schedule through the server 103, or determined by rules that the general users negotiate a schedule. For example, the predetermined schedule words may be "see you in cinema," "see you then," or the words satisfying the rules which may be "see you at 5 o'clock," "cinema," and the like. In some embodiments, one word may be a predetermined schedule word if the word satisfies a predetermined rule.

The server 103 may determine whether the communication message includes a predetermined schedule word based on a set of predetermined schedule words that is pre-stored and may include one or more predetermined schedule words. A word in the communication massage is considered as a predetermined schedule word if the set of predetermined schedule words includes the word, and a word is not a predetermined schedule word if the set of predetermined schedule words does not include the word.

The server 103 may acquire at least one word from the communication messages using a word segmentation algorithm to segment the words in the messages. The server may further determine whether the at least one word is included in the set of predetermined schedule words. In one embodiment, the server 103 may determines that a communication message includes a predetermined schedule word when any one word of the message is included in the set of predetermined schedule words. In another embodiment, the server 103 may determines that the communication does not include a predetermined schedule word when no word of the massage is included in the set of predetermined schedule word.

In one embodiment, the server 103 determines if every word in a communication message matches with the predetermined schedule words of the set of predetermined schedule words. In one embodiment, the set of predetermined schedule words may include usage information indicating usage frequency of each predetermined schedule word. In some embodiments, the predetermined schedule words may have different usage frequencies. Some predetermined schedule words have a low usage frequency and are rarely included in a communication message. When the server 103 determines if words in a communication message match with the predetermined schedule words with low usage frequency, there's a high probability that the words of the communication message do not match with the predetermined schedule words with low usage frequency, resulting in unnecessary waste of resources.

In order to improve matching efficiency and avoid waste of resources, the set of predetermined schedule words may include a first set of predetermined schedule words having a usage frequency greater than or equal to a predetermined threshold, and a second set of predetermined schedule words having a usage frequency lower than the predetermined threshold. In one embodiment, after the server acquires a word of a communication message, it first determines if the word is included in the first set of predetermined schedule words. If the word of the communication message is included in the first set of predetermined schedule words, there is no need to match the word with the predetermined schedule words in the second set of predetermined schedule words. The communication message is determined to include a predetermined schedule word based on the match with the first set of predetermined schedule words. In the illustrated embodiment, the server 103 does not have to the word of the communication message with every predetermined schedule word, instead just the predetermined schedule words in the first set of predetermined schedule words.

In one embodiment, when the server 103 determines that every word of the communication message does not match with the predetermined schedule words of the first set of predetermined schedule words, it determines if a word of the message matches with the predetermined schedule words of the second set of predetermined schedule words. If any word of the communication message matches with the predetermined schedule words of the second set of predetermined schedule words, the communication message is determined to include a predetermined schedule word. If no word of the communication message matches with the predetermined schedule words of the second set of predetermined schedule words, the communication message is determined to include no predetermined schedule word.

In some embodiments, the server 103 may determines usage frequency of words of a communication message. If the words of the communication message all have a high usage frequency, the server 103 matches the words only with the first set of predetermined schedule words. If the words of the communication message all have a low usage frequency, the server 103 matches the words only with the second set of predetermined schedule words, so as to save time for matching, improve matching efficiency, and avoid waste of resources.

In some embodiments, the set of predetermined schedule words may be stored by the server 103 or specified servers other than the server 103. If the set of predetermined schedule words is stored by the server 103, the server 103 may directly access the set of predetermined schedule words and determine if at least one word of a communication message is included in the set of predetermined schedule words. If the set of predetermined schedule words is stored by the specified servers other than the server 103, the server 103 may invoke an interface with the specified server and send a query request including at least one word of the communication message to the specified server. The specified server may access a set of predetermined schedule words, determine if the at least one word is included in the set of predetermined schedule words, and send the determination result back to the server 103. The server 103 may then determine if the set of predetermined schedule words includes the at least one word based on the determination result.

With respect to the first and second sets of predetermined schedule words, they may be both stored in the server 103 or the specified server, or the first set of predetermined schedule words is stored on the server 103 and the second set of predetermined schedule words is stored on the specified server, or vice versa.

In the illustrated embodiments, the communication message is a text message, so the server 103 may segment the words directly. If the communication message is not a text message, it can be converted to a text message for determining the words in the communication message. That is, the server 103 may first determine if the communication message is a text message when the communication message is received. The server 103 may use a word segmentation algorithm to acquire at least one word from the communication message when the communication message is a text message. If the communication message is not a text message, the server 103 may convert the communication message to a text message. For example, the server 103 may extract a voice message in the communication message, convert the voice message to a text message using a voice recognition technology, and then segment the converted text message using the word segmentation algorithm to acquire the at least one word.

In some embodiments, the sequence of executing steps 303 and 304 may be different from that shown in FIG. 3. For example, step 303 and step 304 may be performed simultaneously or in tandem, or step 304 is performed before step 303.

In step 305, when the server 103 determines that the communication message includes a predetermined schedule word, it determines that step 306 and step 308 are to be performed.

When the communication message includes a predetermined schedule word, it indicates that the first user and the second user are negotiating a schedule. In one embodiment, the server 103 may send prompt information to at least one of the first terminal or the second terminal. The prompt information reminds a user of the at least one of the first terminal and the second terminal to acquire contact information of a user of the other terminal. For example, the server 103 may send the prompt information to the first terminal 101 for reminding a first user associated with the first terminal 101 to acquire the contact information of the second user, or the server 103 may send the prompt information to second terminal 102 for reminding a second user associated with the second terminal 102 to acquire the contact information of the first user.

In one embodiment, the server may determine if the first user or the second user has already acquired the contact information of the other user. It is not necessary to send the prompt information to the first terminal 101 if the first user has already acquired the contact information of the second user; and it is not necessary to send the prompt information to the second terminal 102 if the second user has already acquired the contact information of the first user.

In some embodiments, step 305 may include at least one of the following steps (1)-(4).

(1) The server 103 may send a query request including at least a second user identification to the first terminal 101 when the sever 103 determines that the communication message includes a predetermined schedule word. The first terminal 101 may search for contact information corresponding to the second user identification when receiving the query request and, if the contact information corresponding to the second user identification is not found, send query failure information to the server indicating the first terminal does not have the contact information corresponding to the second user identification. The server 103 may perform step 306 when receiving the query failure information.

The first terminal 101 stores an address book which may include multiple pieces of other users' contact information. In some embodiments, the contact information of other users may include, for example, a phone number, an office address, an home address, a user nickname, a user account number, and the like, which is not limited by these example. When the first terminal 101 receives the query request, it searches for contact information corresponding to the second user identification in the address book.

For example, the first terminal 101 may acquire a remark name pre-assigned for the first user identification to determine if the address book includes the contact information of the remark name. In some embodiments, a piece of query-success information is sent to the server 103 if the first terminal 101 determines that the address book includes the contact information of the remark name and received by the server 103 to indicate that the first user has already acquired the contact information of the second user and that there is no need to send the prompt information to the first terminal 101. A piece of query-failure information is sent to the server 103 if the first terminal 101 determines that the address book does not include the contact information of the remark name and received by the server 103 to indicate that the first user has not acquired the contact information of the second user and that the prompt information should be sent to the first terminal 101 to remind the first user to acquire the contact information of the second user.

(2) Second data information corresponding to the second terminal 102 is acquired when the communication message is determined to include a predetermined schedule word by the server 103. The server 103 determines if the second data information includes the contact information. Step 306 is performed when the second data information does not include the contact information.

In one embodiment, the server 103 may store data information corresponding to every user identification. The data information may include, for example, contact information, head portrait, chat history of the users, and the like, which is not limited by these examples.

The first user and the second user may both view the data information of the other user. For example, the first user may trigger a view-data operation to view data information corresponding to the second user identification on the first terminal 101. The first terminal 101 may send the data information acquisition request including the second user identification to the server 103 when detecting the view-data operation. The server 103 may acquire second data information corresponding to the second data identification when receiving the data information acquisition request, and send the second data information to the first terminal 101. The first terminal 101 presents the second data information when receiving the second data information. The first user may view the second data information.

In some embodiments, in order to determine if the first user has already acquired the contact information of the second user, the server 103 may determine if the second data information includes the contact information of the second user. The first user may acquire the contact information by viewing the second data information if the second data information includes the contact information, such that it is determined that the first user has already acquired the contact information of the second user. The server 103 does not then send the prompt information to the first terminal 101. If the server 103 determines that the second data information does not include the contact information of the second user, it determines that the first user may not acquire the contact information of the second user when viewing the second data information. The server 103 sends the prompt information to the first terminal 101.

(3) When determining that the communication message includes a predetermined schedule word, the server 103 may send a query request including at least the second user identification to the first terminal 101, acquire second data information corresponding to the second terminal 102, and determine if the second data information includes the contact information of the second user. When the server 103 receives a piece of query-failure information from the first terminal 101 and determines that the second data information does not include the contact information of the second user, the server 103 performs the step 306.

(4) The server 103 may determine if the communication messages include the contact information of the second user. When the communication message does not include the contact information, step 306 is performed.

For example, the server 103 may determine if the communication message includes a continuous 11-digit number indicating a phone number, or any words indicating contact information, for example, "phone number," "mobile number," and the like. When the server 103 determines that the communication message does not include a continuous 11-digit number and words indicting contact information, step 306 is performed.

In addition, in order to determine if the second user has already acquired the contact information of the first user, step 305 may further include any one of the following steps (5)-(8).

(5) When determining that the communication message includes a predetermined schedule word, the server 103 may send a query request including at least the first user identification to the second terminal 102. The second terminal 102 may search for the contact information corresponding to the first user identification when receiving the query request and send query-failure information to the server 103 when the contact information corresponding to the first user identification is not founded. The server performs step 308 when it receives the query-failure information.

(6) When determining that the communication message includes a predetermined schedule word, the server 103 may acquire first data information corresponding to the first terminal 101, and determine if the first data information includes the contact information of the first user. When the first data information does not include the contact information of the first user, step 308 is performed.

(7) When determining that the communication message includes the predetermined schedule word, the server 103 may acquire first data information corresponding to the first terminal 101, and determine if the first data information includes the contact information of the first user. When the first data information does not include the contact information, step 308 is performed.

(8) The server 103 determines if the communication messages include the contact information. When the communication message does not include the contact information of the first user, step 308 is performed.

The specific processes of steps (5)-(8) are the similar to the steps (1)-(4) above, which will not be elaborated herein.

In step 306, the server 103 sends first prompt information to the first terminal 101.

In one embodiment, the first prompt information includes information to remind the first user to acquire the contact information of the second user. The first prompt information may be, for example, an instant message or email and the like, which is not limited by these examples.

In one embodiment, the first prompt information may include a message such as "Currently you are negotiating a dating matter. Please make sure you have the phone number of the other side so as to avoid future inconvenience in your appointment."

In step 307, the first prompt information is presented when the first terminal 101 receives the first prompt information.

When the first terminal 101 receives the first prompt information, a prompt window or an interactive interface with the second terminal 102 is displayed in the first terminal 101 to shown the first prompt information.

The first user may view the first prompt information when the first terminal 101 shows the first prompt information, and use the first terminal 101 to acquire contact information of the second user based on the first prompt information.

In step 308, the server send second prompt information to the second terminal 102.

The second prompt information is to remind the second user to acquire the contact information of the first user. The second prompt information may be, for example, an instant message or an email, and the like, which is not limited by these examples.

In step 309, the second prompt information is presented when the second terminal 102 receives the second prompt information.

When the second terminal 102 receives the second prompt information, a prompt window or an interactive interface with the first terminal 101 is displayed in the second terminal 102 to show the second prompt information.

The second user may view the second prompt information when the second terminal presents the second prompt information, and use the second terminal 102 to acquire the contact information of the first user based on the second prompt information.

Although FIG. 3 shows that the server 103 may send both the first prompt information to the first terminal 101 and send the second prompt information to the second terminal 102, the server 103 may only send the first prompt information to the first terminal 101, or only send the second prompt information the second terminal 102. In one embodiment, the terminal to which the prompt information is sent may be determined by performing at least one of steps (1)-(8) above. In another embodiment, the server 101 may have a default setting in which the prompt information could be sent to the terminal initiating the communication message, or the terminal receiving the communication message, or both the terminal receiving the communication message and the terminal initiating the communication message. In some embodiments, the sequence of sending the first prompt information to the first terminal 101 and sending the second prompt information to the second terminal 102 is not limited. In some embodiments, the server 103 may send the first prompt information to the first terminal 101 before sending the second prompt information to the second terminal 102, or vice versa, or send them simultaneously to the first terminal and the second terminal, respectively.

The first user and the second user may continue to negotiate the schedule in the subsequent processes, so the serve 103 may still receive the communication messages including predetermined schedule words, such that the prompt information may be repeatedly sent to the user which may bother the user. In some embodiments, if a communication message sent by the first terminal 101 to the second terminal 102 or a communication message sent by the second terminal 102 to the first terminal 101 is received by the server 103 in a predetermined duration after the server 103 determines that a prior communication message includes a predetermined schedule word, the server 103 skips performing the steps 304-308 but merely forwards the communication messages. The predetermined duration may be, for example, one day, twelve hours, and the like, which is not limited by these examples.

In the illustrated embodiments, the steps 304-308 are performed after the server 103 receives the communication message sent by the first terminal to the second terminal. In some embodiments, the steps 304-308 may be performed after the server 103 receives a communication message sent by the second terminal 102 to the first terminal 101, which will not be discussed in detail herein.

When two users negotiate a dating matter such as a meeting, dining, or going to the movies by a social application, they generally focus on information such as appointment time or place. The users easily ignore if they have contact information of the other user, such as phone number. If one user has no contact information of the other user, he or she cannot contact with the other user when going for the appointment later on, or the user cannot tell the other user in time that he or she cannot make the appointment due to emergency matters, which may cause inconvenience. According to embodiments of the present disclosure, a server is configured to send prompt information to remind one or both users to acquire contact information of the other user when they negotiate a dating matter. The method 300 further takes into account communications after the negotiation for the dating matter, to improve user experience.

In the illustrated embodiment, a server determines whether a communication message includes a predetermined schedule word by acquiring the communication message transmitted between a first terminal and a second terminal. The server sends prompt information to at least one of the first terminal and the second terminal when the communication message includes a predetermined schedule word. At least one of the first and second terminals that receives the prompt information is configured to present the prompt information to remind its user to acquire contact information of the other user so that the reminded user may communicate with the other user based on the acquired contact information, which avoids inconvenience in communication due to lack of contact information of the other user.

Figure 4A:
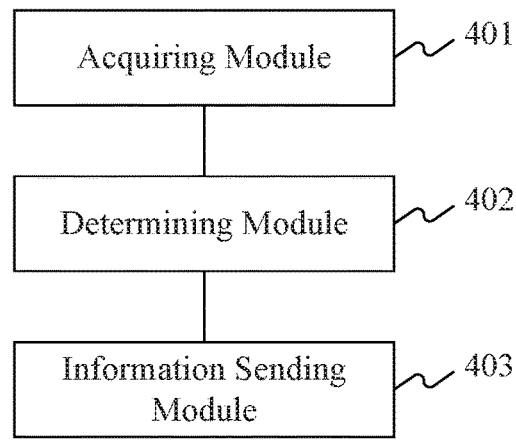
FIG. 4A is a block diagram illustrating a device for processing a communication message according to an exemplary embodiment of the present disclosure.

FIG. 4A is a block diagram illustrating a device 400 for processing a communication message according to an exemplary embodiment. The device 400 may be a server device, such as the server 103. As shown in FIG. 4A, the device 400 may include an acquiring module 401, a determining module 402, and an information sending module 403.

The acquiring module 401 is configured to acquire a communication message transmitted between a first terminal and a second terminal.

The determining module 402 is configured to determine if the communication message includes a predetermined schedule word.

The information sending module 403 is configured to send prompt information to at least one of the first terminal and the second terminal when the communication message includes a predetermined schedule word. The prompt information reminds a user of the at least one of the first terminal and the second terminal to acquire contact information of a user of the other terminal.

In the illustrated embodiment, a server determines whether a communication message includes a predetermined schedule word by acquiring the communication message transmitted between a first terminal and a second terminal. The server sends prompt information to at least one of the first terminal and the second terminal when the communication message includes a predetermined schedule word. At least one of the first and second terminals that receives the prompt information is configured to present the prompt information to remind its user to acquire contact information of the other user so that the reminded user may communicate with the other user based on the acquired contact information, which avoids inconvenience in communication due to lack of contact information of the other user.

In some embodiments, the acquiring module 401 is further configured to receive a communication message sent by the first terminal to the second terminal; or receive a communication message sent by the second terminal to the first terminal.

Figure 4B:
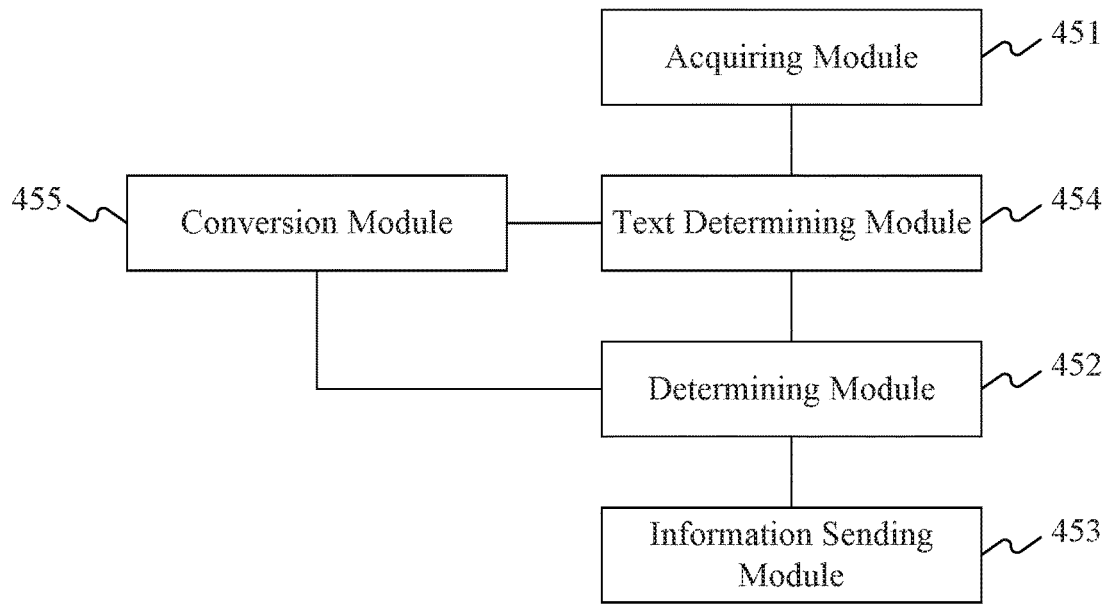
FIG. 4B is a block diagram illustrating another device for processing a communication message according to an exemplary embodiment of the present disclosure.

FIG. 4B is a block diagram illustrating a device 450 for processing a communication message according to an exemplary embodiment. The device 450 may be a server device, such as the server 103. As shown in FIG. 4B, the device 450 may include an acquiring module 451, a determining module 452, an information sending module 453, a text determining module 454, and a conversion module 455. The acquiring module 451, the determining module 452, and the information sending module 453 are similar to the acquiring module 401, the determining module 402, and the information sending module 403, respectively, so that the detailed descriptions of these module are omitted herein. The text determining module 404 is configured to determine whether the communication message is a text message. The conversion module 405 is configured to convert the communication message to a text message when the communication message is not a text message.

In some embodiments, the determining module 402 or 452 is further configured to acquire at least one word from the communication message using a word segmentation algorithm; determine whether the at least one word is included in a set of predetermined schedule words; and determine that the communication message includes a predetermined schedule word when the at least one word is included in the set of predetermined schedule words.

In some embodiments, the information sending module 403 or 453 is further configured to send a query request to the first terminal including at least a second user identification when the communication message is determined to include a predetermined schedule word, such that the first terminal searches for contact information corresponding to the second user identification upon reception of the query request; and send the prompt information to the first terminal when the server receives a piece query-failure information from the first terminal.

In some embodiments, the information sending module 403 or 453 is further configured to send a query request to the second terminal including at least a first user identification when the communication message is determined to include a predetermined schedule word, such that the second terminal searches for contact information corresponding to the first user identification upon reception of the query request; and send the prompt information to the second terminal when the server receives a piece of query-failure information from the second terminal.

In some embodiments, the information sending module 403 or 453 is further configured to acquire second data information corresponding to the second terminal when the communication message is determined to include a predetermined schedule word; determine whether the second data information includes the contact information; and send the prompt information to the first terminal when the second data information does not include the contact information.

The manners of performing operations of the modules have been described in detail in the illustrated methods above, and will not be elaborated again herein.

In some embodiments, the functions of the modules described above may be combined or divided, and performed by different modules. That is, the structure of the device 400 may be divided into different modules to complete a part or all of the functions described above.

Figure 5:
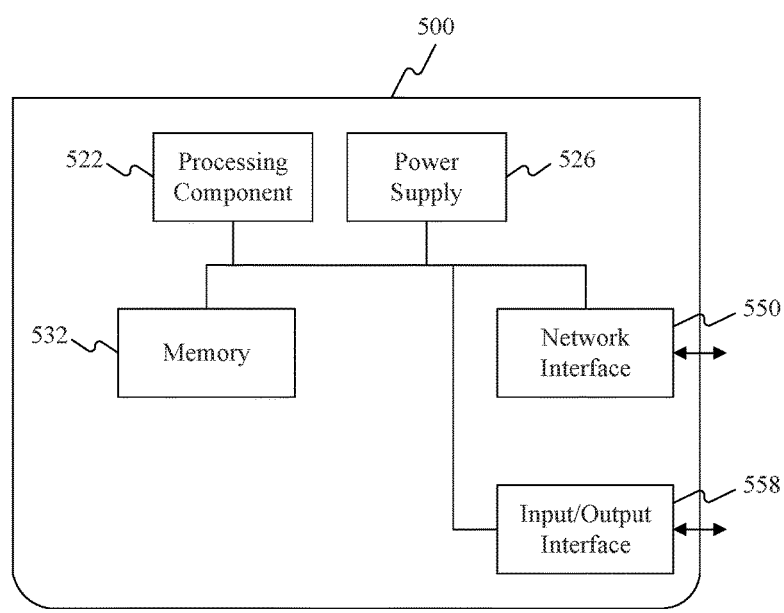
FIG. 5 is a block diagram illustrating a device for processing a communication message according to an exemplary embodiment of the present disclosure.

FIG. 5 is a block diagram illustrating a device 500 for processing a communication message according to an exemplary embodiment. For example, the device 500 may be implemented as a server, such as server 103. As shown in FIG. 5, the device 500 may include a processing component 522 having one or more processors, and storage resources represented by memory 532 for storing instructions, e.g., application programs, executable by the processing component 522. The application programs stored in the memory 532 may include one or more modules. Each module may include a set of instructions. Further, the processing component 522 may be configured to execute the sets of instructions and perform the method for processing a communication message described above.

The device 500 may also include a power component 526 to perform power management of the device 500, a wired or wireless network interfaces 550 to connect the device 500 to a network, and an input/output (I/O) interface 558. The device 500 may operate based on an operating system stored in the memory 532, such as Windows Server™, Mac OS X™ Unix™, Linux™, FreeBSD™, or the like.

Figure 6:
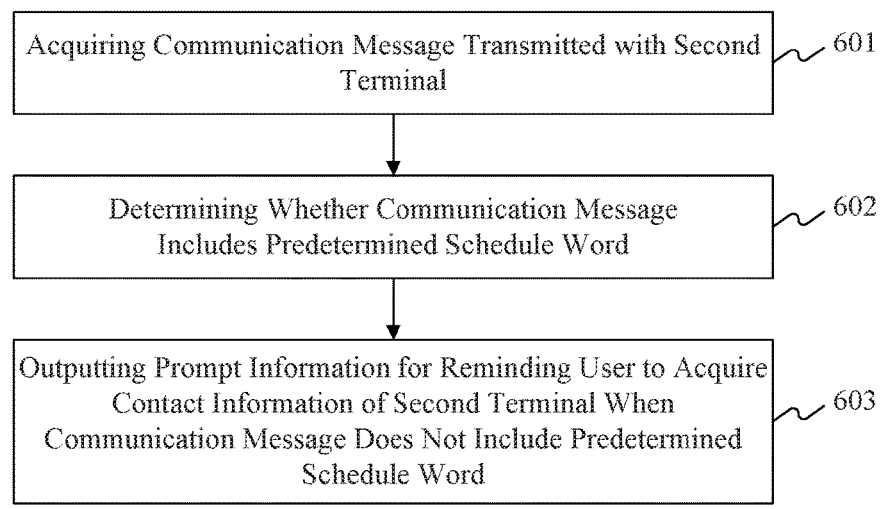
FIG. 6 is flow chart showing a method for processing a communication message according to an exemplary embodiment of the present disclosure.

FIG. 6 is flow chart showing a method 600 for processing a communication message according to an exemplary embodiment. The method 600 may be performed in a terminal. As shown in FIG. 6, the method 600 includes the following steps.

In step 601, a first terminal acquires a communication message with a second terminal. The communication message may be a message sent by the first terminal to the second terminal or vice versa.

In step 602, the first terminal determines whether the communication message includes a predetermined schedule word.

In step 603, when the communication message is determined to include a predetermined schedule word, the first terminal outputs prompt information for reminding a user of the first terminal to acquire contact information of a user of the second terminal.

In an exemplary embodiment, the communication message transmitted with the second terminal in step 601, for example, may be a communication message sent by the first terminal to the second terminal, or a communication message received by the first terminal from the second terminal.

In some embodiments, the determining whether the communication message includes a predetermined schedule word may include: acquiring at least one word from the communication message using a word segmentation algorithm; determining whether the at least one word is included in a set of predetermined schedule words; and determining that the communication message includes a predetermined schedule word when the at least one word is included in the set of predetermined schedule words.

In some embodiments, the outputting prompt information including: querying the contact information corresponding the second terminal; and outputting the prompt information when the query fails. In the illustrated embodiment, the first terminal determines if it stores contact information of the second user corresponding to the second terminal. If the first terminal determines that it does not find the contact information of the second user, i.e., query fails, it outputs the prompt information to remind the first user to acquire the contact information of the second user.

In some embodiments, the outputting prompt information including: sending a first request to a server when the communication message is determined to include a predetermined schedule word, the first request being to acquire second data information corresponding to the second terminal from the server; determining whether the second data information includes the contact information; and outputting the prompt information when the second data information does not include the contact information.

All of the above embodiments may be in any combination which will not be elaborated herein.

Figure 7:
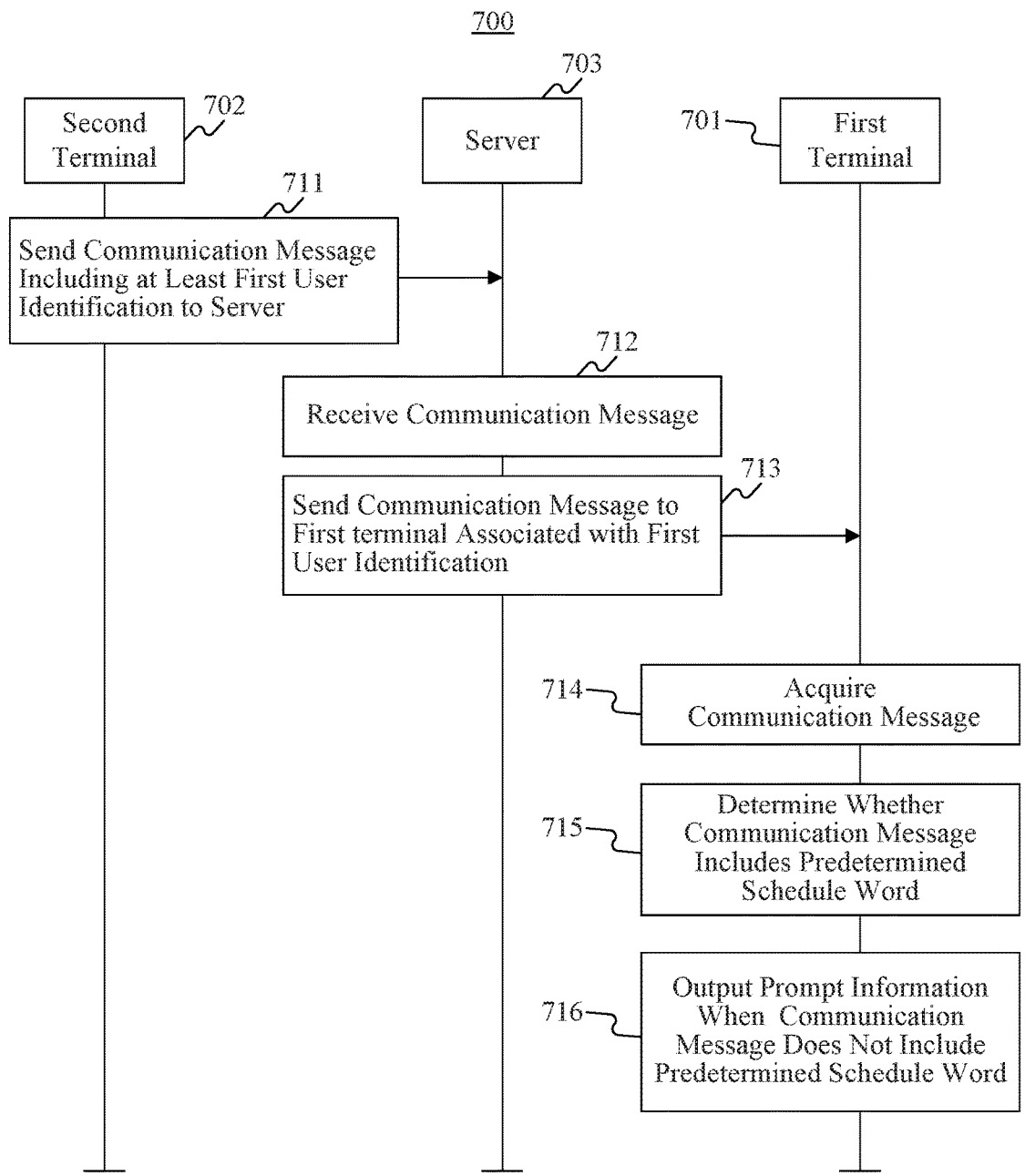
FIG. 7 is flow chart showing another method for processing a communication message according to an exemplary embodiment of the present disclosure.

FIG. 7 is flow chart showing a method 700 for processing a communication message, according to an exemplary embodiment. The method 700 may be performed by a first terminal 701, a second terminal 702, and a server 703. As shown in FIG. 7, the method 700 for processing a communication message may include the following steps.

In step 711, the second terminal 702 sends a communication message including at least first user identification to the server 703.

In step 712, the server 703 receives the communication message.

Based on the second user identification, the second terminal 702 logins the server 703, which maintains a user relationship chain for the second user identification. The user relationship chain indicates a relationship between the second user identification and one or more other user identifications. The second terminal 102 may acquire the user relationship chain of the second user identification through a social application and present/display the user relationship chain. When the second terminal 702 detects a selection of a first user identification of the user relationship chain, the second terminal 702 may display an interactive interface with the first user identification, acquire a communication message inputted by a second user associated with the second terminal 702 in the interactive interface, and send the communication message to the server 703. The server 703 may send the communication message including the first user identification to the first terminal 701. The communication message indicates that the communication message is sent by the second terminal 702 to the first terminal 701.

In step 713, the server 703 sends the communication message to the first terminal of the first user associated with the first user identification.

In step 714, the first terminal 701 acquires the communication message.

According to the first user identification, the server 703 may determine the first terminal 701 associated with the first user identification and send the communication message to the first terminal 701. IN one embodiment, the communication message may further include the second user identification, and the first terminal 701 may present the communication message when receiving the communication message. The first user may view the second user identification to learn that the communication message is sent by the second terminal 702 associated with the second user.

In step 715, the first terminal 701 determines whether the communication includes a predetermined schedule word.

In order to determine whether the first user and the second user are negotiating a schedule, the first terminal 701 may determine whether the communication message includes a predetermined schedule word when receiving the communication message. When the communication includes a predetermined schedule word, it is determined that the first user and the second user are negotiating a schedule. The first user is reminded to acquire the contact information of the second user. When the communication does not include a predetermined schedule word, the first user and the second user does not negotiate a schedule. There is no need to remind the first user to acquire the contact information of the second user.

The specific steps for determining if the communication includes a predetermined schedule word is similar to those described with respect to step 304, which will not be elaborated herein.

In step 716, when the first terminal 701 determines that the communication message does not include a predetermined schedule word, it outputs prompt information for reminding the first user to acquire the contact information of the second user.

The first prompt information reminding the first user to acquire the contact information of the second user may be, for example, an instant messaging message or email and the like, which is not limited by these examples. For example, the first prompt information may be "Currently you are negotiating a dating matter. Please make sure you have the phone number of the other side so as to avoid inconvenience in your appointment."

A prompt window presenting the prompt information is popped up or the interactive interface with the second terminal in which presenting the prompt information is presented when the first terminal output the prompts information.

When the first terminal 701 receives the prompt information, a prompt window or an interactive interface with the second terminal 702 is displayed in the first terminal 701 to shown the prompt information.

In one embodiment, the first terminal 701 may determine whether the first terminal 701 has already acquired the contact information of the second user, before outputting the prompt information.

In some embodiments, step 716 may include any one of the following steps (1)-(4).

(1) The first terminal 701 searches for the contact information corresponding to the second user identification when the first terminal 701 determines that the communication message includes a predetermined schedule word, and outputs the prompt information when the first terminal does not find the contact information of the second user.

The details for searching for the contact information corresponding to the second user identification by the first terminal 701 is similar to those explained in the step 305, and will not be elaborated herein.

(2) When determining that the communication message includes a predetermined schedule word, the first terminal 701 may send a first request to the server 703. The first request requests second data information corresponding to the second terminal 702. The first terminal determines if second data information includes the contact information of the second user upon reception of the second data information corresponding to the second terminal 702, and outputs the prompt information when the second data information does not include the contact information of the second user.

When the first terminal 701 determines that the communication message includes a predetermined schedule word, it sends a first request to the server 703. The first request requests the second data information corresponding to the second terminal 702. The server 703 sends the second data information to the first terminal 701 when it receives the first request. When the first terminal 701 receives the second data information, it determines if the second data information include the contact information of the second user.

Other details of acquiring the contact information of the second user through the second data information can be referred to the step 305, and will not be elaborated herein.

(3) When the first terminal 701 determines that the communication message includes a predetermined schedule word, it searches itself for the contact information corresponding to the second terminal 701. When the first terminal 701 does not find the contact information of the second user from the search, it sends a first request to the server 703. The first request requests the second data information corresponding to the second terminal. The server 703 sends the second data information to the first terminal 701 when it receives the first request. When the first terminal 701 receives the second data information, it determines if the second data information include the contact information of the second user.

(4) The first terminal 701 determines if the communication message includes the contact information of the second user, and outputs the prompt information when the communication message does not include the contact information.

In some embodiments, in addition to outputting the prompt information in the first terminal 701 for the first user, the first terminal 701 may also cause prompt information to be sent to the second terminal 702 to remind the second user to acquire the contact information of the first user. In one embodiment, the first terminal 701 sends a piece of prompt information to the server 703, and the server 703 forwards the prompt information to the second terminal 702. The second terminal 702 outputs the prompt information so as to remind the second user to acquire the contact information of the first user.

In some embodiments, the step 711 can be performed by the first terminal 701 and the steps 714-716 can be performed by the second terminal 702.

Figure 8:
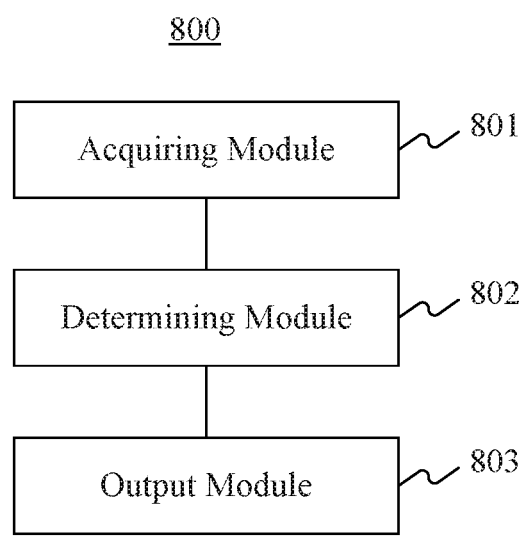
FIG. 8 is a block diagram illustrating a device for processing a communication message according to an exemplary embodiment of the present disclosure.

FIG. 8 is a block diagram illustrating a device 800 for processing a communication message, according to an exemplary embodiment. The device 800 may be a terminal, such as the first terminal 701 or the second terminal 702. As shown in FIG. 8, the device 800 may include a acquiring module 801, a determining module 802, and a output module 803. For purpose of illustration, the device 800 communicates with a second terminal.

The acquiring module 801 is configured to acquire a communication message transmitted with the second terminal.

The determining module 802 is configured to determine whether the communication message includes a predetermined schedule word.

The output module 803 is configured to output prompt information when the communication message includes a predetermined schedule word. The prompt information reminds a user of the device 800 to acquire contact information of a user of the second terminal.

In some embodiments, the determining module 802 is further configured to acquire at least one word from the communication message using a word segmentation algorithm; determine whether the at least one word is included in a set of predetermined schedule words, and determine that the communication message includes a predetermined schedule word when the at least one word is included in the set of predetermined schedule words.

In some embodiments, the output module 803 is further configured to query the contact information corresponding to the second terminal; and output the prompt information when the query fails.

In some embodiments, the output module 803 is further configured to output a first request to a server when the communication message includes a predetermined schedule word. The first request is to request for second data information corresponding to the second terminal from a server. The output module 803 is configured to determine whether the second data information includes the contact information of the second user associated with the second terminal when receiving the second data information corresponding to the second terminal; and output the prompt information when the second data information does not include the contact information of the second user.

The specific manners in which the device 800 performs the steps 801-803 have been described in detail in the methods above, which will not be elaborated herein.

In some embodiments, the functions of the modules described above may be combined or divided, and performed by different modules. That is, the structure of the device 800 may be divided into different modules to complete a part or all of the functions described above.

Figure 9:
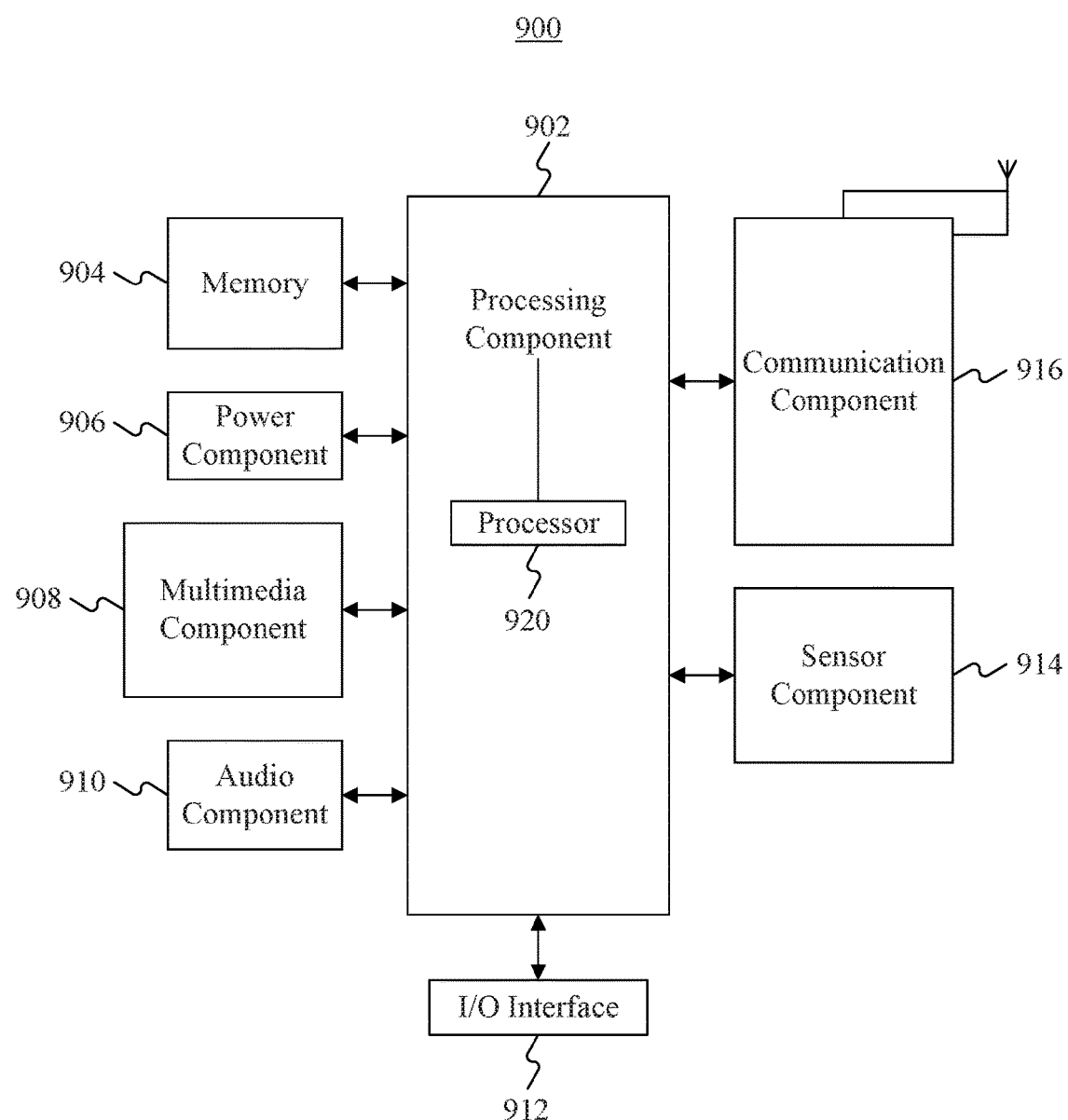
FIG. 9 is a block diagram illustrating another device for processing a communication message according to an exemplary embodiment of the present disclosure.

FIG. 9 is a block diagram of a device 900 for processing a communication message according to an exemplary embodiment. For example, the device 900 may be a mobile phone, a computer, a digital broadcast terminal, a messaging device, a gaming console, a tablet, a medical device, an exercise equipment, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with show, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 808 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 800. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal show (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 802 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the show and the keypad, of the device 900, a change in position of the device 900 or a component of the device 900, a presence or absence of user contact with the device 800, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 may access a wireless network based on a communication standard, such as WiFi, 2G, 3G, or 4G, or a combination thereof. In one exemplary embodiment, the communication component 816 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID)

technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of a terminal, causes the terminal to perform a method for processing a communication message as described in the present disclosure.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention only be limited by the appended claims.

What is claimed is:

1. A method for processing a communication message, comprising:
   acquiring a communication message transmitted between a first terminal and a second terminal; and
   sending prompt information to at least one of the first terminal and the second terminal when the communication message includes a predetermined schedule word, the predetermined schedule word being relevant to scheduling an appointment, the prompt information including information for reminding a user of the at least one of the first terminal and the second terminal to acquire contact information of a user of the other terminal,
   wherein the sending prompt information to at least one of the first terminal and the second terminal comprises:
      when the communication message includes the predetermined schedule word, sending a query request including at least a second user identification to the first terminal or sending a query request including at least a first user identification to the second terminal, such that the first terminal searches for contact information corresponding to the second user identification or the second terminal searches for contact information corresponding to the first user identification; and
      when query-failure information is received from the first terminal or the second terminal, sending the prompt information to the first terminal or the second terminal, wherein the query-failure information indicates the first terminal includes no contact information corresponding to the second user identification or the second terminal includes no contact information corresponding to the first user identification.

2. The method of claim 1, wherein the acquiring a communication message transmitted between the first terminal and the second terminal comprises:
   receiving a communication message sent by the first terminal to the second terminal; or
   receiving a communication message sent by the second terminal to the first terminal.

3. The method of claim 1, further comprising:
   determining whether the communication message is a text message; and
   converting the communication message to a text message when the communication message is not a text message.

4. The method of claim 1, further comprising:
   determining whether the communication message includes the predetermined schedule word, comprising:
      acquiring at least one word from the communication message using a word segmentation algorithm;
      determining whether the at least one word is included in a set of predetermined schedule words; and
      determining that the communication message includes the predetermined schedule word when the at least one word is included in the set of predetermined schedule words.

5. The method of claim 1, wherein the sending prompt information to at least one of the first terminal and the second terminal further comprises:
   acquiring second data information corresponding to the second terminal when the communication message includes the predetermined schedule word; and
   sending the prompt information to the first terminal when the second data information does not include the contact information.

6. The method of claim 1, wherein the sending prompt information to at least one of the first terminal and the second terminal further comprises:
   acquiring first data information corresponding to the first terminal when the communication message includes the predetermined schedule word; and
   sending the prompt information to the second terminal when the first data information does not include the contact information.

7. A method for processing a communication message performed at a first terminal, comprising:
   acquiring a communication message transmitted with a second terminal; and
   outputting prompt information when the communication message includes a predetermined schedule word, the predetermined schedule word being relevant to scheduling an appointment, the prompt information including information for reminding a user of the first terminal to acquire contact information of a user of the second terminal,
   wherein the outputting prompt information comprises:
      searching for contact information associated with the second terminal; and
      outputting the prompt information when the searching for contact information associated with the second terminal fails.

8. The method of claim 7, further comprising:
  determining whether the communication message includes the predetermined schedule word, the determining including:
    acquiring at least one word from the communication message using a word segmentation algorithm;
    determining whether the at least one word is included in a set of predetermined schedule words; and
    determining that the communication message includes the predetermined schedule word when the at least one word is included in the set of predetermined schedule words.

9. The method of claim 7, wherein the outputting prompt information further comprises:
  sending a first request to a server when the communication message includes the predetermined schedule word, the first request including information for acquiring, from a server, second data information corresponding to the second terminal;
  determining whether the second data information includes the contact information; and
  outputting the prompt information when the second data information does not include the contact information.

10. A device for processing a communication message, comprising:
  a processor; and
  a memory for storing instructions executable by the processor,
  wherein the processor is configured to execute the instructions to:
    acquire a communication message transmitted between a first terminal and a second terminal;
    determine whether the communication message includes a predetermined schedule word; and
    send prompt information to at least one of the first terminal and the second terminal when the communication message includes the predetermined schedule word, the predetermined schedule word being relevant to scheduling an appointment, the prompt information including information for reminding a user of the at least one of the first terminal and the second terminal to acquire contact information of a user of the other terminal,
  wherein the processor is further configured to execute the instructions to:
    when the communication message includes the predetermined schedule word, send a query request including at least a second user identification to the first terminal or send a query request including at least a first user identification to the second terminal, such that the first terminal searches for contact information corresponding to the second user identification or the second terminal searches for contact information corresponding to the first user identification; and
    when query-failure information is received from the first terminal or the second terminal, send the prompt information to the first terminal or the second terminal, wherein the query-failure information indicates the first terminal includes no contact information corresponding to the second user identification or the second terminal includes no contact information corresponding to the first user identification.

11. The device of claim 10, wherein the processor is further configured to:
  acquire at least one word from the communication message using a word segmentation algorithm;
  determine whether the at least one word is included in a set of predetermined schedule words; and
  determine that the communication message includes a predetermined schedule word when the at least one word is included in the set of predetermined schedule words.

12. The device of claim 10, wherein the processor is further configured to:
  acquire second data information corresponding to the second terminal when the communication message includes the predetermined schedule word;
  determine whether the second data information includes the contact information; and
  send the prompt information to the first terminal when the second data information does not include the contact information.

13. A device for processing a communication message, comprising:
  a processor; and
  a memory for storing instructions executable by the processor,
  wherein the processor is configured to execute the instructions to:
    acquire a communication message transmitted with a second terminal;
    determine whether the communication message includes a predetermined schedule word; and
    output prompt information when the communication message includes the predetermined schedule word, the predetermined schedule word being relevant to scheduling an appointment, the prompt information including information for reminding a user of the first terminal to acquire contact information of a user of the second terminal,
  wherein the processor is further configured to execute the instructions to:
    search for contact information associated with the second terminal; and
    output the prompt information when the searching for contact information associated with the second terminal fails.

14. The device of claim 13, wherein the processor is further configured to:
  acquire at least one word from the communication message using a word segmentation algorithm;
  determine whether the at least one word is included in a set of predetermined schedule words; and
  determine that the communication message includes the predetermined schedule word when the at least one word is included in the set of predetermined schedule words.

15. The device of claim 13, wherein the processor is further configured to:
  send a first request to a server when the communication message includes the predetermined schedule word, the first request including information for acquiring, from a server, second data information corresponding to the second terminal;
  determine whether the second data information includes the contact information; and
  output the prompt information when the second data information does not include the contact information.

* * * * *